TAPE TRANSPORT APPARATUS AND INTERCHANGEABLE CARTRIDGE THEREFOR

Filed April 29, 1968 2 Sheets-Sheet 1

JAMES W. F. BLACKIE
ASHLEY J. HOLLINGSWORTH
CHESTER W. NEWELL
*INVENTORS*

BY Flehr, Hohbach, Test, Albritton & Herbert
ATTORNEYS

TAPE TRANSPORT APPARATUS AND INTERCHANGEABLE CARTRIDGE THEREFOR

Filed April 29, 1968 2 Sheets-Sheet 2

INVENTORS
JAMES W. F. BLACKIE
ASHLEY J. HOLLINGSWORTH
CHESTER W. NEWELL

BY Flehr, Hohbach, Test, Albritton & Herbert
ATTORNEYS

United States Patent Office 3,526,371
Patented Sept. 1, 1970

3,526,371
TAPE TRANSPORT APPARATUS AND INTERCHANGEABLE CARTRIDGE THEREFOR

James W. F. Blackie, Sunnyvale, Ashley J. Hollingsworth, Atherton, and Chester W. Newell, San Jose, Calif., assignors to Newell Industries, Inc., Sunnyvale, Calif., a corporation of California Filed Apr. 29, 1968, Ser. No. 725,113
Int. Cl. G11b *15/32*
U.S. Cl. 242—192 10 Claims

ABSTRACT OF THE DISCLOSURE

A tape transport apparatus of a type employing a motor and drive spindle or capstan cooperates with a removable cartridge containing supply and take-up rolls of tape arranged to advance and retreat relative to an idler carried by the cartridge. The drive capstan cooperates with the idler and thereby advances tape from one roll to the other.

BACKGROUND OF THE INVENTION AND OBJECTS

This invention relates to tape transport apparatus of a type utilizing a replaceable cartridge wherein a number of cartridges can be interchangeably employed with a tape transport deck.

In general, several types of tape cartridges have heretofore been known. One of the more popular types employs a socalled mobius or continuous loop of tape irreversibly wrapped upon a single supporting hub. Another type employs a pair of rolls mounted with pre-threaded tape extending from one roll to the other. Customarily, in the latter type, the tape is advanced or reversed by driving one or the other of the hubs of the two rolls directly through a side entrant splined drive spindle to feed the tape in each of two opposite directions. In the case of the so-called mobius loop style cartridge, the tape is led to the edge of the cartridge where it engages a drive spindle or capstan cooperating with the face of the tape and in this manner the tape is drawn past a transducer or pickup head.

It is a general object of the present invention to provide an improved cartridge construction and tape transport apparatus cooperating therewith.

According to the present invention, a cartridge is provided utilizing a pair of tape hubs wrapped to form supply and take-up rolls of tape wherein the tape is advanced from one hub to the other by driving a resilient annular rotating body disposed in rim-driven relationship to the edges of the two rolls. In this manner, it is relatively easy to insert a cartridge of the type described into a slot for operation therein and thereby achieve utmost simplicity in the operation of a tape transport apparatus. It will be readily apparent from the description herebelow that such slot loading of the cartridge is readily achieved without certain complexities heretofore involved in the more popular cartridge styles as above. It will also be apparent that tape driving is not applied directly to the hubs of the two rolls so that the transducing performance of the apparatus may be significantly improved.

It is, accordingly, another object of the invention to provide a tape transport apparatus and cartridge therefor of utmost simplicity without sacrifice of performance requirements.

SUMMARY OF THE INVENTION

In general, there is provided herein a tape transport of a type having a length of recording tape wrapped to form supply and take-up rolls. A base supports a drive motor for rotating an annular drive element, such as a capstan or spindle, coupled to the motor. A cartridge cooperates with the drive element in feeding tape between supply and take-up rolls. A resilient annular rotating body is disposed at least partially between the walls of the cartridge. The drive element or capstan rotates the body to drive the two rolls via a resilient driving interface formed between the driving element and the rotating resilient body. A yielding biasing means serves to draw a pair of carriages carrying the rolls toward the body so that the rolls advance and retreat relative to the resilient rotating body during feeding of tape.

Each of the carriages is preferably mounted upon antifriction supports which define a common plane with respect to each of the two carriages whereby the advancing and retreating movements of the rolls relative to the resilient, rotating body may be maintained with precision.

The above general arrangement will be more clearly apparent from the following detailed description when considered in conjunction with the drawing which may be described as follows.

DESCRIPTION OF THE PREFERRED EMBODIMENTS

Figure 1:
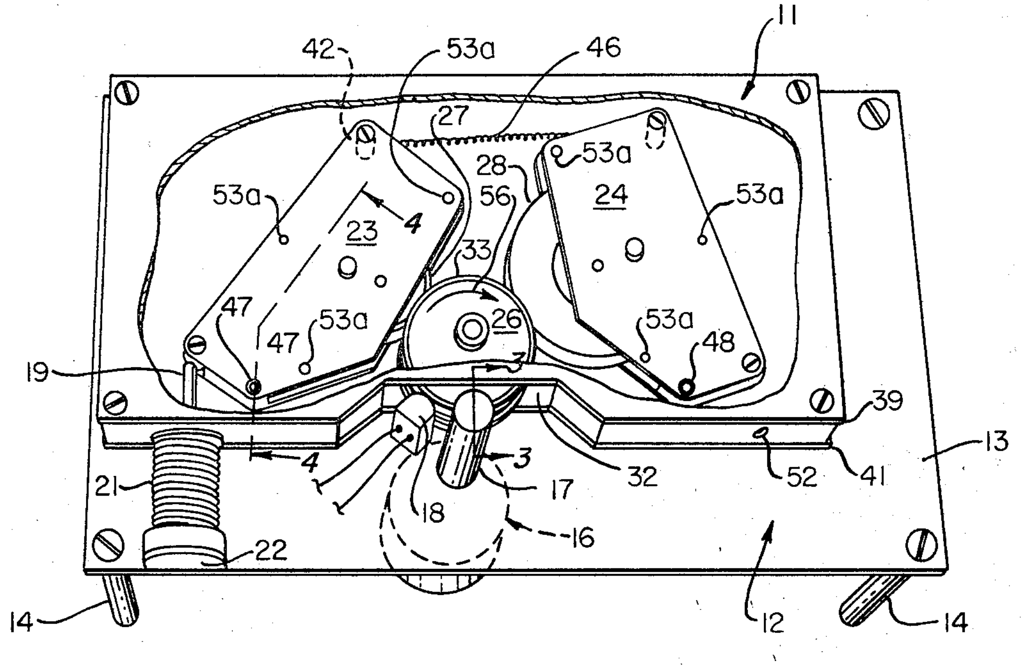
FIG. 1 is a perspective view of tape transport apparatus according to the invention.

In general, the apparatus shown in FIG. 1 comprises a cartridge assembly 11 and a deck assembly 12 for operating the cartridge. Deck assembly 12 comprises means forming a support base consisting of the base plate 13 suitably supported by means as schematically shown by the stand-off posts 14. Base plate 13 carries a small electric drive motor equipped with a rotatable drive element or capstan 17 extending upwardly through base plate 13. Suitable means (not shown) have been employed for supporting motor 16 beneath base plate 13 as would be readily apparent to those skilled in this art. Motor 16 reverses.

On the upper side of base plate 13, a magnetic recording and/or reproducing transducer 18 is suitably supported in position to cooperate with magnetic tape of cartridge assembly 11. If desired, it may be appropriate to employ a second recording-reproducing transducer on the other side of capstan 17 and similarly arranged to cooperate with the magnetic tape of cartridge assembly 11.

Tape deck 13 further supports a resilient force transmitting push-rod 19 and spring 21 carried by the bracket 22 for directing and applying the force of spring 21 to that one of a pair of carriage assemblies 23, 24 disposed on the take-up side of an annular rotating resilient body 26 so as to press the take-up roll 27 against body 26 with a greater force than that provided between the supply roll 28 and body 26 as now to be described and for the reasons outlined in U.S. Pat. 3,370,803.

Thus, cartridge assembly 11 comprises means defining relatively closely spaced front and back walls 29, 31 respectively (FIG. 4) of the cartridge. As noted below, cartridge assembly 11 may be inverted to reverse the feeding of tape and at that time the "front" wall 29 would, obviously, become the "back" wall. However, for ease of explanation, walls 29, 31 will be referred to as "front" and "back" walls notwithstanding such reversal thereof. A resilient annular rotating body 26 rotates at least partially between walls 29, 31 inasmuch as the walls 29, 31 are formed with an access opening 32 along one side edge of cartridge assembly 11. Body 26 functions as an idler roller adapted to be rotated by drive capstan 17 via a resilient driving interface formed between capstan 17 and body 26.

Figures 2, 3:
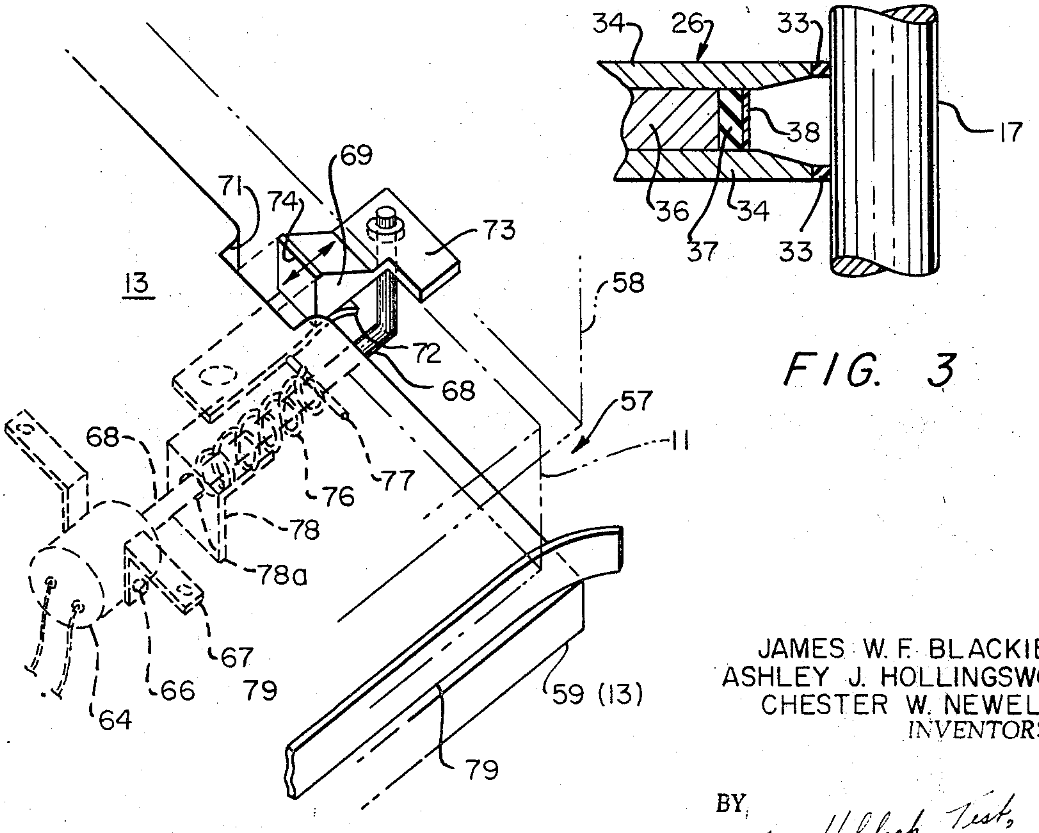
FIG. 2 is a perspective view, in enlarged detail, of a rear portion of the apparatus shown in FIG. 1.
FIG. 3 is a further enlarged detail view taken along the line 3—3 of FIG. 1.

The interface comprises, in the preferred form shown in FIGS. 1 and 3, a pair of resilient tires 33 of suitable material, such as rubber, formed respectively about each of a pair of spaced flanges 34 secured to the ends of a central core or hub 36 of the idler 26. Idler 26 forms a resilient annular rotating body by means of the resilient tire 37 carried therearound which forms the supporting surface for the span of magnetic recording tape 38 trained therearound between the two rolls 27, 28. As thus arranged, idler 26, when urged into abutting relation to the rotating drive capstan 17, will be rotated for feeding tape.

The foregoing arrangement for forming the resilient driving interface between capstan 17 and idler 26 has the particular advantage in that it will minimize the effect of any wear which may occur on tires 33. Such wear may, as is known, have an adverse effect upon the constant speed of feeding tape and, even though such speed fluctuations may be of an extremely momentary nature, such adverse effects are to be avoided. Further, inasmuch as tires 33 are each individually related to the cartridge and, hence, are subjected to any wearing action only at times when the cartridge is played, it will be readily apparent that the adverse effect caused by any wear of tires 33 will be minimal and not applied to other cartridges. In short, the wear, if any, can only affect one cartridge, and not all (as would occur if the wear were to occur on the driving element).

Cartridge assembly 11 further includes carriage means in the form of first and second carriage assemblies 23, 24 (as mentioned) for movement in a zone defined between the inner surfaces of walls 29, 31. Each carriage 23, 24 is mounted to be moved between advanced and retracted positions during the feeding of tape so as to respectively advance and retreat relative to the annular resilient rotating idler assembly or body 26.

Thus, each carriage assembly 23, 24 comprises a pair of spaced side plates 39, 41. Plates 39, 41 are held spaced apart by means of cylindrical spacers 42 held in place by coaxially disposed recessed screws threaded into plate 41.

In adidtion to spacers 42, plates 39, 41 are held uniformly spaced apart by additional means which serve to mount carriages 23, 24 for pivotal movement between advanced and retracted positions so as to carry rolls 27, 28 respectively to advance and retreat relative to idler assembly 26. Accordingly, a force transmitting element in the form of the push-rod 19 acts in the midplane 44 of roll 27 to urge the tape on roll 27 into engagement with resilient tire 37 of idler assembly 26 with a greater force than is applied between roll 28 and tire 37.

Thus, means for drawing each of rolls 27, 28 into mutual engagement with idler assembly 26 includes the elongated bias spring 46 suitably connected to each of two cylindrical spacers 42 of carriages 23, 24 respectively.

Thus, each carriage 23, 24 is pivotally supported for movement about pivot pins 47, 48, suitably hardened to provide good wear characteristics. Pins 47 are coaxially disposed within the bronze bushings 43 whereby the carriage may pivot about the axis of pins 47. Each bushing 43 includes a radially inwardly constricted portion **43*a* forming a support point for each carriage 23, 24 lying on the midplane 44 of rolls 27, 28,** as in FIG. 4.

Cartridge assembly 11 is adapted to be inverted in order to constitute the heretofore designated supply roll 28, a take-up roll and to constitute the heretofore designated take-up roll 27 as a supply roll and in this manner to reverse the tape drive.

Figure 4:
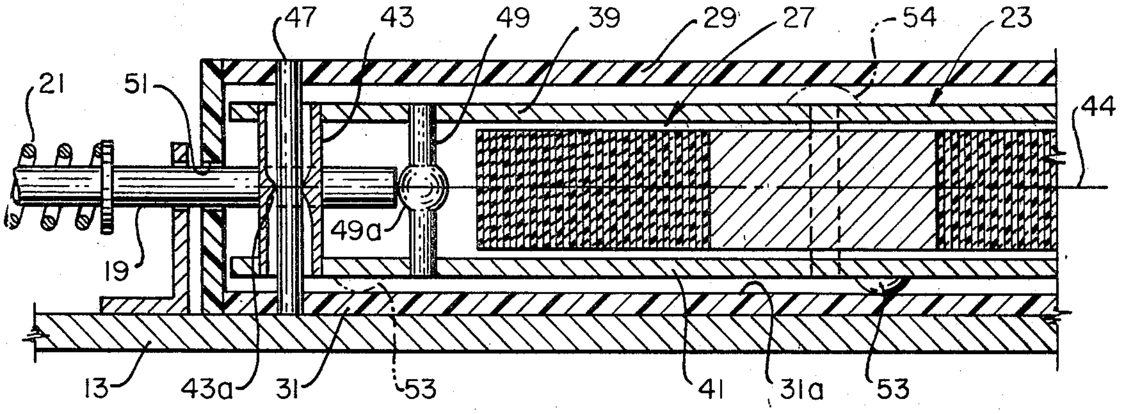
FIG. 4 is an enlarged elevation section view taken along the line 4—4 of FIG. 1.

Accordingly, the description as above provided relative to the structure shown in FIG. 4 is essentially duplicated for carriage 24 and similarly arranged. Hence, it is not considered necessary to pursue additional explanation and description thereof.

Plates 39, 41 are further maintained in their spaced apart relationship by means of the spacer pins 49 formed with an enlarged ball-like mid-section having its equator lying in the midplane 44 for purposes of receiving the thrust of push-rod 19. As thus arranged, it is readily apparent that push-rod 19 serves to apply, in the midplane 44, a force directed against the enlargement **49*a* of pin 49 and thereby to pivot assembly 23 (or assembly 24 when cartridge assembly 11 has been inverted) about a pivot pin such as pin 47. Access for rod 11 to enter through the edge of cartridge assembly 11 is suitably provided by means of the opening 51 and, when cartridge assembly 11 has been inverted, a correspondingly disposed opening 52 serves to accommodate entry of push-rod 19.**

Means have been provided whereby the plane of movement of each of the two rolls 27, 28 shall be maintained in a common plane as defined by midplane 44. Thus, portions of the inner surface of wall 31 defines the support plane against which each of carriages 23, 24 may be registered.

More particularly, with respect to that surface **31*a* of back wall 31 which is located within cartridge 11, the entire wall surface 31*a* defines a support plane common to each of carriages 23, 24. It will, of course, be readily apparent that the entire surface 31*a* of wall 31 need not lie in a common plane but only sufficient portions thereof as needed to define such plane. However, in the interest of simplicity of manufacture, it is readily evident that a single machining operation can be applied to the material forming wall 31 so as to constitute the entire wall a substantially perfectly flat surface upon which to rest and register both carriages 23, 24.**

Thus, on one side of each of carriages 23, 24, a trio of anti-friction elements such as the small registration buttons 53 of suitable anti-friction material are carried beneath the marked locations indicated by the points **53*a* in FIG. 1. On the opposite side of each carriage 23, 24, a single, centrally located pressure or thrust button 54 of anti-friction material serves to define a single opposing point of support for carriages 23, 24. Button 54 is, as noted, centrally located upon the centroid defined between the three buttons 53.**

As thus arranged, it will be readily apparent that each of carriages 23, 24 will move in a closely controlled common midplane 44 during their advancing and retreating movements as tape is wound and unwound from the rolls. The single point of applied pivoting support provided by the portion **43*a* of bushing 43 permits each carriage 23, 24 to adjust to any slight twisting movement which might otherwise provide a binding of the carriage within the cartridge and permits the machined plane of wall 31** to define the plane of their movements.

Means have been provided herein further for urging the the take-up roll against the resilient tire 37 of idler assembly 26 with a greater force than is applied between the supply roll and idler as now to be described.

The bias spring 46 will draw each of the two rolls 27, 28 with equal force against tire 37. In order to increase the force on the take-up side, push-rod 19 projects through opening 51 and yieldingly bears against the enlarged portion **49*a* of spacer pin 49. Thus, a "lever-arm" is defined between spacer pin 49 and the pivot pin 47 to cause carriage 23 to be further urged against tire 37.**

Tape 38, having been pre-threaded or otherwise applied about idler assembly 26 (in the direction shown by the arrow 56) will, thus, be moved past transducer 18 for cooperation therewith.

As noted above, the foregoing cartridge construction 11 and tape deck 12 are particularly applicable for employment in an embodiment utilizing a mere slot for receiving the cartridge assembly 11.

Thus, as shown in FIG. 2, a slot 57 has been schematically shown as defined between a pair of spaced side walls 58, 59. (Wall 59 may be formed, as shown, by base plate 13.)

Means are provided which serve to retain and selectively urge cartridge assembly 11 into slot 57 to establish driving contact engagement at the resilient interface between capstan 17 and the resilient flanges provided by tires 33 (FIG. 3) in order to rotate idler assembly 26.

Thus, a solenoid 64 has been pivotally mounted by means of the pivot points 66 of a mounting bracket 67 secured, as by screws, to the underside of wall 59.

Solenoid 64 further carries as an extension of the armature thereof an elongated actuator rod 68 formed with an upturned end portion secured to a drive pawl 69 adapted to move into and out of a recess 71 formed in the side edge of base plate 13 (or as referred to above in the side wall 59 of slot 57). Pawl 69 has been disposed for movement into and out of the plane of base plate 13 and, thus, is spring loaded upwardly by means of the leaf spring 72 attached to the underside of base plate 13. Pawl 69 can be further manually operated to be depressed by means of the pawl extension tab 73 formed as a unitary construction with pawl 69. The rear of pawl 69 is, of course, tapered as in the case of latches 61 whereby a cartridge assembly 11 can be readily moved into engagement with pawl 69 to depress pawl 69 out of the path of the plane of movement of cartridge assembly 11.

After passing the leading edge 74 of pawl 69, pawl 69 will, of course, be returned by spring 72 to engage the rear edge of cartridge assembly 11.

Solenoid 64 serves to move actuator rod 68 between advanced and retracted positions against the counteracting resilient force of spring 76 acting thereon between a stop pin 77 and a mounting bracket 78. Bracket 78 has been provided with an elongated opening **78*a* through which rod 68 passes and is permitted limited vertical freedom of movement to accommodate the movements of pawl 69 into and out of the plane of base plate 13.**

In operation, the foregoing construction serves to feed tape in a given direction as follows:

Cartridge assembly 11 is first slidably positioned into slot 57 until pawl 69 engages the cartridge edge and, upon actuation of drive motor 16, solenoid 64 will be energized to draw cartridge assembly 11 tightly into engagement with capstan 17. Movement of cartridge assembly 11 into slot 57, when cartridge 11 is properly guided, as by means of the side guides 79, serves to properly position cartridge assembly 11 whereby push-rod 19 enters opening 51. As thus positioned, push-rod 19 moves into a resilient abutting relation against pin 49, so as to apply the aforementioned greater pressure between the take-up roll and tire 37 of idler assembly 26 than is applied between the supply roll and idler assembly 26. Although a solenoid 64 has been shown, it is contemplated that the above mentioned force differential may also be accomplished by means of the principles shown in U.S. Pat. No. 3,370,804.

While the cartridge is shown as being drawn against capstan 17, it is apparent that capstan 17 could be arranged by suitable means to be moved into engagement with idler 26.

Further, such alignment serves to properly position transducer assembly 18 and drive capstan 17 relative to idler 26. Accordingly, when it is desired to feed tape in the direction of arrow 57 from supply roll 28 to the take-up roll 27, motor 16 will be energized as well as solenoid 64 whereby pawl 69 will be moved to further urge cartridge assembly 11 toward drive capstan 17. By means of the resilient interface formed between capstan 17 and idler assembly 26, assembly 26 will be rotated to feed tape.

Figure 5:
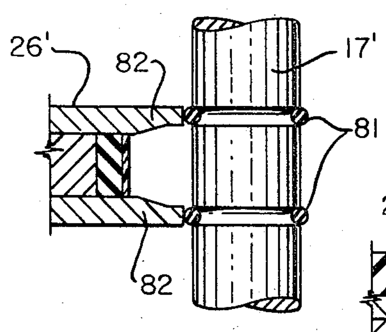
FIGS. 5, 6 and 7 are each additional embodiments of a resilient driving interface shown in enlarged detail in the region of the line 3—3 of FIG. 1.
Figure 6:
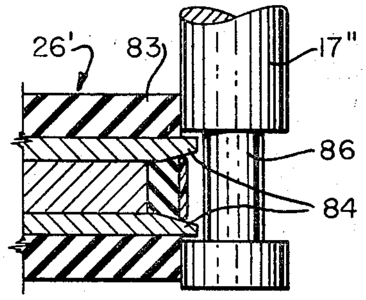
Figure 7:
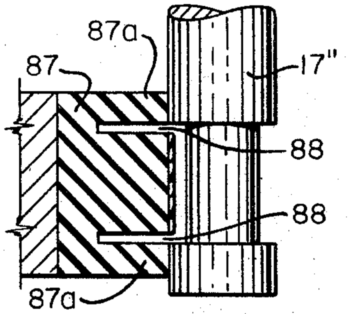

While such resilient interface may be achieved by disposing the capstan in direct facial engagement with the tape disposed about the idler, there are additional means shown in FIGS. 5, 6 and 7 whereby a resilient interface may be formed between an idler assembly similar to 26 and the rotating drive element or capstan 17, but in which the capstan does not contact the tape record surface. Accordingly, for example, with reference to FIG. 5, a rotating drive capstan 17′ has been provided with a pair of resilient O-rings 81 disposed in alignment to cooperate with the flanges 82 of idler assembly 26′. This particular embodiment may be preferable in situations involving further simplicity of construction, inasmuch as the manufacturing cost of this embodiment may be somewhat less than others of the embodiments herein.

As shown in FIG. 6, another resilient interface is provided between a rotating idler assembly 26″ and rotating drive spindle 17″. Thus, idler assembly 26″ has been formed with a pair of resilient cylindrical end portions 83 of suitable resilient material, such as rubber, flanking the flanges 84. Drive capstan 17″ has been formed with a necked-down spindle portion 86 serving to accommodate the entry of flanges 84.

The embodiment as shown in FIG. 6 may have, in certain circumstances, the same advantages as in the FIG. 3 structure but with the additional ease in obtaining precision manufacture by means of grinding, in one operation, the three resilient elements to a common diameter.

Further, another embodiment of the resilient interface has been shown in FIG.7 wherein ease of manufacture can be an attribute, inasmuch as the rotating resilient annular body has been formed by means of grinding a single cylindrical resilient tire 87 to a common diameter. Then, without further manipulation to assemble the flanges, marginal portions **87*a* are merely formed by radially slitting tire 87 in spaced planes to provide the peripheral grooves 88 adapted to cooperate with thin stationary tape guides extending, for example, substantially from the point of departure of tape from the supply roll to the point of arrival of tape at the take-up roll and in bounding relation to opposite edges of the tape arriving and departing to and from the rolls. The margins 87*a*, thus formed, readily cooperate with the drive spindle 17″.**

As explained above, in order to feed tape in each of two opposite directions, in certain circumstances, it is desirable to merely remove cartridge assembly 11 from slot 57 and invert it whereby opening 52 will be positioned to cooperate with push-rod 19 and thereby constitute the previous supply roll as the take-up roll and vice versa.

Figure 8:
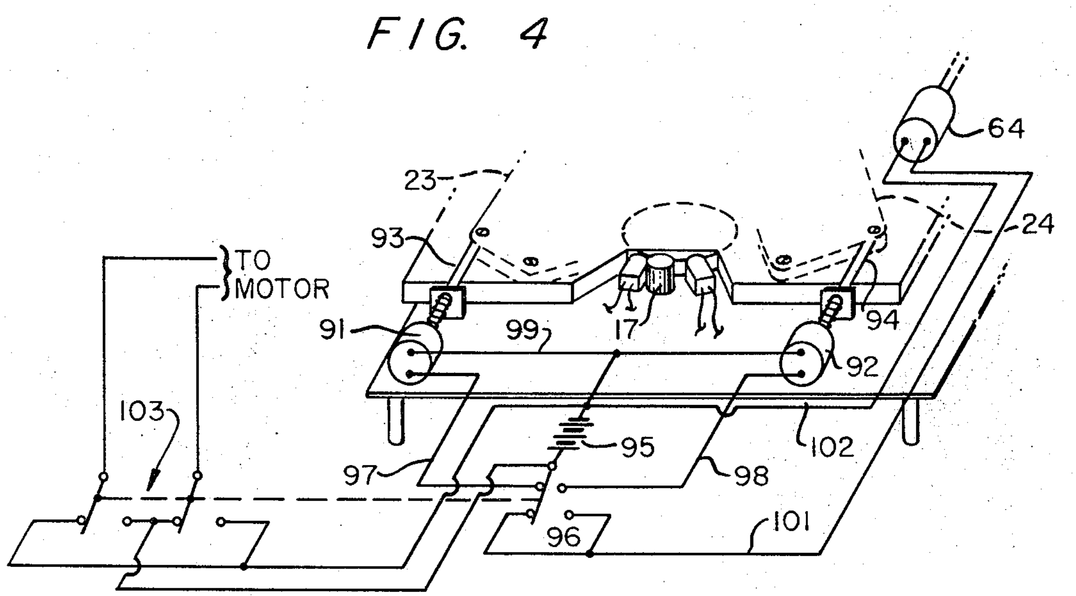
FIG. 8 is a perspective view in enlarged detail of a portion of a tape transport apparatus of the type shown in FIG. 1 schematically illustrating another embodiment according to the invention.

In another embodiment, as now to be described with respect to FIG. 8, wherein it is assumed that the major portion of the foregoing construction has been employed, it will be apparent that the tape may be readily fed in each of two opposite directions merely by reversing the drive applied to capstan 17.

Thus, as shown in FIG. 8, solenoids 91, 92 of a type adapted to thrust push-rows 93, 94 between advanced and retracted positions may be selectively energized to urge their associated rod 93 or 94 toward the cartridge.

Accordingly, a circuit is provided commencing with the positive terminal of a power source such as battery 95, and passing through the switch armature 96 to lead 97 or 98, as desired. Each lead 97, 98 leads to one or the other of solenoids 91, 92 whereby the return of the circuit can be formed by means of the comomn lead 99 which is coupled to the negative side of battery 95. At the same time as one or the other of the two solenoids 91, 92 have been energized, there will be a connection made to operate solenoid 64 by virtue of a circuit traced from the positive terminal of battery 95 through armature 96 of the switch to one or the other of the two contact points serving lead 101 which extends to energize solenoid 64. A return lead 102 has been coupled into the negative side of battery 95 so as to complete the circuit. Thus, whenever one or the other of the two solenoids 91, 92 has been energized, and, regardless of the direction of feeding of tape, cartridge assembly 11 will be urged into the resilient driving engagement formed by the resilient interface between drive capstan 17 and idler assembly 26.

A suitable reversing switch 103 may readily be ganged together with switch armature 96 so as to reverse the power to motor 16 in conjunction with the foregoing reverse application of forces to cartridges 23, 24.

From the foregoing, it will be readily apparent that there has been provided an improved cartridge construction of a type adapted to be slot-loaded into cooperative engagement with a tape drive deck and wherein the tape may be fed in each of two opposite directions utilizing an improved tape drive mechanism.

What is claimed is:

1. For use with a magnetic tape transport having a rotating drive element, a cartridge construction adapted to cooperate with the drive element to feed tape between supply and take-up rolls comprising means defining a wall of the cartridge and having an operating zone on one side of the wall, a resilient annular rotating body carried with said wall and disposed at least partially in said zone and adapted to be rotated by said drive element, carriage means movable in said zone, hubs adapted to be wrapped with magnetic recording tape to form rolls carried by said carriage means into engagement with said body to drive said rolls, said carriage means serving to carry the supply and take-up rolls to respectively advance and retreat with respect to said body, and means yieldingly serving to urge said rolls toward said body.

2. A cartridge construction according to claim 1 further comprising wall portions bounding said zone to define registration surface portions, and anti-friction elements for said carriage means and cooperating with said registration surface portions to define the plane of movement of said carriage means.

3. A cartridge construction according to claim 2 wherein said carriage means comprises a pair of movable carriages, and said anti-friction elements comprise relatively small support buttons carried on opposite sides of said carriages in cooperative engagement with the support surfaces defined on opposite walls of the cartridge, said buttons serving to provide a three-point support for each of the carriages in a plane common to each carriage.

4. In a cartridge construction according to claim 1 wherein said rotating, resilient annular body comprises a cylindrical hub member, a resilient tire encircling said hub adapted to engage the rolls of tape, resilient portions flanking said tire and encircling said hub to engage said drive element in driven relation thereto.

5. In a tape transport of a type adapted to feed a length of tape wrapped to form supply and take-up rolls, a rotating drive element, an annular rotating resilient body having a first portion disposed to ride in contiguous driving engagement with the periphery of the rolls, and means flanking said first portion, and spaced from the tape, forming a resilient driving interface between said drive element and body to rotate said body and rolls to feed tape.

6. In a tape transport according to claim 5 wherein flanges flank said first portion, and said interface includes resilient tires carried by said flanges to engage said drive element.

7. In a tape transport according to claim 5 wherein resilient portions of said body flank the first named said portion to engage said drive element and rotate said body and rolls.

8. In a tape transport of a type having a length of recording tape wrapped to form supply and take-up rolls, means defining a base, a drive motor carried by said base, a rotating annular drive element on one side of said base coupled to be driven by said motor, a cartridge construction adapted to cooperate with the drive element to feed tape between supply and take-up rolls including means defining a wall of the cartridge and having an operating zone on one side of the wall, a resilient annular rotating body disposed at least partially in said zone and adapted to be rotated by said drive element, means defining a resilient driving interface between said driving element and said body, means forming first and second carriages carried to move in a plane defined by surface portions of said wall and between advanced and retracted positions to respectively advance and retreat relative to said body, biasing means yieldingly serving to urge said carriages toward said body, and hubs wrapped with magnetic recording tape to form supply and take-up rolls carried by said carriages into engagement with said body to drive said rolls.

9. In a tape transport according to claim 8 further including means providing a resilient force, and an element on said one side of the base for directing and applying said force to that one of said carriages disposed on the take-up side of said body and serving to press the take-up roll against said body with a greater force than that provided between said supply roll and said body.

10. In a tape transport the combination comprising a cartridge construction, a length of tape wrapped to form supply and take-up rolls within the cartridge, an annular rotating resilient body at least partially within the cartridge and having a tire portion disposed to engage the periphery of, and drive, said rolls, said tape being carried about said tire portion for travel between said rolls, a rotating drive element, and means adjacent to and spaced from the tire portion, and tape thereon, forming a resilient driving interface between said drive element and said body within the cartridge.

References Cited

UNITED STATES PATENTS 3,370,804 2/1968 Peyton ---------- 242—55.14 X
3,411,731 11/1968 Kelley ------------ 242—55.13

RICHARD A. SCHACHER, Primary Examiner

U.S. Cl. X.R.

226—181; 242—200